(12) United States Patent
Coyne

(10) Patent No.: US 10,694,352 B2
(45) Date of Patent: Jun. 23, 2020

(54) SYSTEM AND METHOD OF USING PHYSICAL OBJECTS TO CONTROL SOFTWARE ACCESS

(71) Applicant: ACTIVISION PUBLISHING, INC., Santa Monica, CA (US)

(72) Inventor: John Coyne, Manhattan Beach, CA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 0 days.

(21) Appl. No.: 14/925,731

(22) Filed: Oct. 28, 2015

(65) Prior Publication Data

US 2017/0127216 A1    May 4, 2017

(51) Int. Cl.
    *H04W 4/60*    (2018.01)
    *H04W 12/08*   (2009.01)
    *H04W 4/50*    (2018.01)
    *H04W 12/00*   (2009.01)

(52) U.S. Cl.
    CPC ............... *H04W 4/60* (2018.02); *H04W 4/50* (2018.02); *H04W 12/0027* (2019.01); *H04W 12/08* (2013.01)

(58) Field of Classification Search
    CPC .. H04W 4/003; H04W 12/06; H04L 65/1063; H04L 67/12; H04M 1/72577; H04M 1/72527
    USPC ......................................................... 455/438
    See application file for complete search history.

(56) References Cited

U.S. PATENT DOCUMENTS

| | | | |
|---|---|---|---|
| 4,295,039 A | 10/1981 | Stuckert |
| 4,309,569 A | 1/1982  | Merkle |
| 4,658,093 A | 4/1987  | Hellman |
| 4,789,863 A | 12/1988 | Bush |
| 4,827,508 A | 5/1989  | Shear |
| 4,908,861 A | 3/1990  | Brachtl |
| 4,924,378 A | 5/1990  | Hershey |
| 4,937,863 A | 6/1990  | Robert |
| 4,953,209 A | 8/1990  | Ryder |
| 4,977,594 A | 12/1990 | Shear |
| 5,005,122 A | 4/1991  | Griffin |

(Continued)

FOREIGN PATENT DOCUMENTS

| AU | 768367     | 3/2004  |
| AU | 2005215048 | 10/2011 |

(Continued)

OTHER PUBLICATIONS

Schneier, Bruce. "Applied Cryptography: Protocols, Algorithms, and Source code in C" 2d. (New York: John Wiley & Sons, Inc., Jan. 1996) pp. v & 21-27.

(Continued)

*Primary Examiner* — Shahriar Behnamian
(74) *Attorney, Agent, or Firm* — Novel IP

(57) ABSTRACT

A system and method is provided for controlling access to software via a physical object. The system may include one or more of a physical object, such as a toy, a computing device, and a server. The toy may include a unique identifier that permits an owner of the toy to download software to the computing device via the server. In some variations, a purchaser of the toy may be permitted to download software to the computing device directly from a storage device associated with the toy.

20 Claims, 7 Drawing Sheets

(56) References Cited

U.S. PATENT DOCUMENTS

| | | |
|---|---|---|
| 5,005,200 A | 4/1991 | Fischer |
| 5,050,213 A | 9/1991 | Shear |
| 5,065,429 A | 11/1991 | Lang |
| 5,138,711 A | 8/1992 | Miyoshi |
| 5,138,712 A | 8/1992 | Corbin |
| 5,191,613 A | 3/1993 | Graziano |
| 5,204,897 A | 4/1993 | Wyman |
| 5,224,166 A | 6/1993 | Hartman, Jr. |
| 5,231,666 A | 7/1993 | Matyas |
| 5,241,671 A | 8/1993 | Reed |
| 5,247,575 A | 9/1993 | Sprague |
| 5,260,999 A | 11/1993 | Wyman |
| 5,274,757 A | 12/1993 | Miyoshi |
| 5,276,738 A | 1/1994 | Hirsch |
| 5,283,830 A | 2/1994 | Hinsley |
| 5,319,705 A | 6/1994 | Halter |
| 5,337,357 A | 8/1994 | Chou |
| 5,343,527 A | 8/1994 | Moore |
| 5,379,343 A | 1/1995 | Grube |
| 5,412,717 A | 5/1995 | Fischer |
| 5,421,006 A | 5/1995 | Jablon |
| 5,421,009 A | 5/1995 | Platt |
| 5,432,939 A | 7/1995 | Blackledge, Jr. |
| 5,434,791 A | 7/1995 | Koko |
| 5,436,972 A | 7/1995 | Fischer |
| 5,438,508 A | 8/1995 | Wyman |
| 5,450,489 A | 9/1995 | Ostrover |
| 5,450,593 A | 9/1995 | Howell |
| 5,485,577 A | 1/1996 | Eyer |
| 5,530,751 A | 6/1996 | Morris |
| 5,530,796 A | 6/1996 | Wang |
| 5,535,188 A | 7/1996 | Dang |
| 5,553,139 A | 9/1996 | Ross |
| 5,553,143 A | 9/1996 | Ross |
| 5,557,518 A | 9/1996 | Rosen |
| 5,557,765 A | 9/1996 | Lipner |
| 5,561,736 A | 10/1996 | Moore |
| 5,563,946 A | 10/1996 | Cooper |
| 5,590,199 A | 12/1996 | Krajewski |
| 5,621,797 A | 4/1997 | Rosen |
| 5,629,980 A | 5/1997 | Stefik |
| 5,638,513 A | 6/1997 | Ananda |
| 5,642,419 A | 6/1997 | Rosen |
| 5,666,501 A | 9/1997 | Jones |
| 5,685,775 A | 11/1997 | Bakoglu |
| 5,706,507 A | 1/1998 | Schloss |
| 5,708,709 A | 1/1998 | Rose |
| 5,708,764 A | 1/1998 | Borrel |
| 5,715,314 A | 2/1998 | Payne |
| 5,736,985 A | 4/1998 | Lection |
| 5,737,416 A | 4/1998 | Cooper |
| 5,745,678 A | 4/1998 | Herzberg |
| 5,745,879 A | 4/1998 | Wyman |
| 5,754,763 A | 5/1998 | Bereiter |
| 5,758,069 A | 5/1998 | Olsen |
| 5,768,511 A | 6/1998 | Galvin |
| 5,790,664 A | 8/1998 | Coley |
| 5,822,542 A | 10/1998 | Smith |
| 5,825,877 A | 10/1998 | Dan |
| 5,835,692 A | 11/1998 | Cragun |
| 5,835,911 A | 11/1998 | Nakagawa |
| 5,845,067 A | 12/1998 | Porter |
| 5,845,077 A | 12/1998 | Fawcett |
| 5,864,620 A | 1/1999 | Pettitt |
| 5,878,139 A | 3/1999 | Rosen |
| 5,878,233 A | 3/1999 | Schloss |
| 5,881,236 A | 3/1999 | Dickey |
| 5,881,442 A | 3/1999 | Hultberg |
| 5,883,628 A | 3/1999 | Mullaly |
| 5,889,868 A | 3/1999 | Moskowitz |
| 5,892,900 A | 4/1999 | Ginter |
| 5,900,879 A | 5/1999 | Berry |
| 5,903,266 A | 5/1999 | Berstis |
| 5,903,271 A | 5/1999 | Bardon |
| 5,903,650 A | 5/1999 | Ross |
| 5,905,860 A | 5/1999 | Olsen |
| 5,911,045 A | 6/1999 | Leyba |
| 5,919,247 A | 7/1999 | Van |
| 5,920,325 A | 7/1999 | Morgan |
| 5,923,324 A | 7/1999 | Berry |
| 5,953,532 A | 9/1999 | Lochbaum |
| 5,969,724 A | 10/1999 | Berry |
| 5,977,979 A | 11/1999 | Clough |
| 5,990,888 A | 11/1999 | Blades |
| 6,012,961 A | 1/2000 | Sharpe, III et al. .......... 446/298 |
| 6,014,145 A | 1/2000 | Bardon |
| 6,025,839 A | 2/2000 | Schell |
| 6,026,379 A | 2/2000 | Haller |
| 6,029,145 A | 2/2000 | Barritz |
| 6,044,378 A | 3/2000 | Gladney |
| 6,056,786 A | 5/2000 | Rivera |
| 6,059,842 A | 5/2000 | Dumarot |
| 6,067,582 A | 5/2000 | Smith |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,105,069 A | 8/2000 | Franklin |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,158,010 A | 12/2000 | Moriconi |
| 6,185,614 B1 | 2/2001 | Cuomo |
| 6,189,146 B1 | 2/2001 | Misra |
| 6,195,432 B1 | 2/2001 | Takahashi |
| 6,201,881 B1 | 3/2001 | Masuda |
| 6,202,209 B1 | 3/2001 | Bartholomew |
| 6,222,551 B1 | 4/2001 | Schneider |
| 6,237,099 B1 | 5/2001 | Kurokawa |
| 6,253,027 B1 | 6/2001 | Weber |
| 6,253,217 B1 | 6/2001 | Dourish |
| 6,271,842 B1 | 8/2001 | Bardon |
| 6,271,843 B1 | 8/2001 | Lection |
| 6,282,547 B1 | 8/2001 | Hirsch |
| 6,301,707 B1 | 10/2001 | Carroll |
| 6,301,710 B1 | 10/2001 | Fujiwara |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,354,947 B1 | 3/2002 | Dobrusskin et al. ........... 463/43 |
| 6,356,297 B1 | 3/2002 | Cheng |
| 6,367,073 B2 | 4/2002 | Elledge |
| 6,385,596 B1 | 5/2002 | Wiser |
| 6,389,592 B1 | 5/2002 | Ayres |
| 6,408,434 B1 | 6/2002 | Fujiwara |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,493,871 B1 | 12/2002 | McGuire |
| 6,499,053 B1 | 12/2002 | Marquette |
| 6,505,208 B1 | 1/2003 | Kanevsky |
| 6,513,045 B1 | 1/2003 | Casey |
| 6,513,159 B1 | 1/2003 | Dodson |
| 6,525,731 B1 | 2/2003 | Suits |
| 6,539,372 B1 | 3/2003 | Casey |
| 6,546,554 B1 | 4/2003 | Schmidt |
| 6,549,933 B1 | 4/2003 | Barrett |
| 6,560,769 B1 | 5/2003 | Moore |
| 6,567,109 B1 | 5/2003 | Todd |
| 6,584,493 B1 | 6/2003 | Butler |
| 6,604,238 B1 | 8/2003 | Lim |
| 6,612,501 B1 | 9/2003 | Woll et al. .................... 235/494 |
| 6,618,751 B1 | 9/2003 | Challenger |
| 6,634,949 B1 | 10/2003 | Briggs et al. ................... 463/42 |

(56) References Cited

U.S. PATENT DOCUMENTS

| | | | |
|---|---|---|---|
| RE38,375 | E | 12/2003 | Herzberg |
| 6,657,617 | B2 | 12/2003 | Paolini |
| 6,657,642 | B1 | 12/2003 | Bardon |
| 6,684,255 | B1 | 1/2004 | Martin |
| 6,694,508 | B1 | 2/2004 | Moore |
| 6,697,852 | B1 | 2/2004 | Ryu |
| 6,701,517 | B1 | 3/2004 | Moore |
| 6,717,600 | B2 | 4/2004 | Dutta |
| 6,718,549 | B1 | 4/2004 | Narin |
| 6,721,740 | B1 | 4/2004 | Skinner |
| 6,734,884 | B1 | 5/2004 | Berry |
| 6,765,596 | B2 | 7/2004 | Lection |
| 6,781,607 | B1 | 8/2004 | Benham |
| 6,819,669 | B2 | 11/2004 | Rooney |
| 6,832,239 | B1 | 12/2004 | Kraft |
| 6,836,480 | B2 | 12/2004 | Basso |
| 6,886,026 | B1 | 4/2005 | Hanson |
| 6,891,953 | B1 | 5/2005 | Demello |
| 6,948,168 | B1 | 9/2005 | Kuprionas |
| RE38,865 | E | 11/2005 | Dumarot |
| 6,993,596 | B2 | 1/2006 | Hinton |
| 7,028,296 | B2 | 4/2006 | Irfan |
| 7,062,533 | B2 | 6/2006 | Brown |
| 7,143,409 | B2 | 11/2006 | Herrero |
| 7,152,108 | B1 | 12/2006 | Khan |
| 7,209,137 | B2 | 4/2007 | Brokenshire |
| 7,230,616 | B2 | 6/2007 | Taubin |
| 7,249,123 | B2 | 7/2007 | Elder |
| 7,263,511 | B2 | 8/2007 | Bodin |
| 7,287,053 | B2 | 10/2007 | Bodin |
| 7,305,438 | B2 | 12/2007 | Christensen |
| 7,308,476 | B2 | 12/2007 | Mannaru |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,502,759 | B2 * | 3/2009 | Hannigan ............... G06Q 30/02 123/201 |
| 7,503,007 | B2 | 3/2009 | Goodman |
| 7,506,264 | B2 | 3/2009 | Polan |
| 7,515,136 | B1 | 4/2009 | Kanevsky |
| 7,525,964 | B2 | 4/2009 | Astley |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,596,596 | B2 | 9/2009 | Chen |
| 7,640,587 | B2 | 12/2009 | Fox |
| 7,667,701 | B2 | 2/2010 | Leah |
| 7,698,656 | B2 | 4/2010 | Srivastava |
| 7,702,784 | B2 | 4/2010 | Berstis |
| 7,714,867 | B2 | 5/2010 | Doi |
| 7,719,532 | B2 | 5/2010 | Schardt |
| 7,719,535 | B2 | 5/2010 | Tadokoro |
| 7,734,691 | B2 | 6/2010 | Creamer |
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,773,087 | B2 | 8/2010 | Fowler |
| 7,774,407 | B2 | 8/2010 | Daly |
| 7,782,318 | B2 | 8/2010 | Shearer |
| 7,792,263 | B2 | 9/2010 | D Amora |
| 7,792,801 | B2 | 9/2010 | Hamilton, II |
| 7,796,128 | B2 | 9/2010 | Radzikowski |
| 7,808,500 | B2 | 10/2010 | Shearer |
| 7,814,152 | B2 | 10/2010 | McGowan |
| 7,827,318 | B2 | 11/2010 | Hinton |
| 7,843,471 | B2 | 11/2010 | Doan |
| 7,844,663 | B2 | 11/2010 | Boutboul |
| 7,847,799 | B2 | 12/2010 | Taubin |
| 7,856,469 | B2 | 12/2010 | Chen |
| 7,862,428 | B2 * | 1/2011 | Borge ..................... A63F 13/02 463/29 |
| 7,873,485 | B2 | 1/2011 | Castelli |
| 7,882,222 | B2 | 2/2011 | Dolbier |
| 7,882,243 | B2 | 2/2011 | Ivory |
| 7,884,819 | B2 | 2/2011 | Kuesel |
| 7,886,045 | B2 | 2/2011 | Bates |
| 7,890,623 | B2 | 2/2011 | Bates |
| 7,893,936 | B2 | 2/2011 | Shearer |
| 7,904,829 | B2 | 3/2011 | Fox |
| 7,921,128 | B2 | 4/2011 | Hamilton, II |
| 7,940,265 | B2 | 5/2011 | Brown |
| 7,945,620 | B2 | 5/2011 | Bou-Ghannam |
| 7,945,802 | B2 | 5/2011 | Hamilton, II |
| 7,970,837 | B2 | 6/2011 | Lyle |
| 7,970,840 | B2 | 6/2011 | Cannon et al. |
| 7,985,138 | B2 | 7/2011 | Acharya |
| 7,990,387 | B2 | 8/2011 | Hamilton, II |
| 7,996,164 | B2 | 8/2011 | Hamilton, II |
| 8,001,161 | B2 | 8/2011 | Finn |
| 8,004,518 | B2 | 8/2011 | Fowler |
| 8,005,025 | B2 | 8/2011 | Bodin |
| 8,006,182 | B2 | 8/2011 | Bates |
| 8,013,861 | B2 | 9/2011 | Hamilton, II |
| 8,018,453 | B2 | 9/2011 | Fowler |
| 8,018,462 | B2 | 9/2011 | Bhogal |
| 8,019,797 | B2 | 9/2011 | Hamilton, II |
| 8,019,858 | B2 | 9/2011 | Bauchot |
| 8,022,948 | B2 | 9/2011 | Garbow |
| 8,022,950 | B2 | 9/2011 | Brown |
| 8,026,913 | B2 | 9/2011 | Garbow |
| 8,028,021 | B2 | 9/2011 | Reisinger |
| 8,028,022 | B2 | 9/2011 | Brownholtz |
| 8,037,416 | B2 | 10/2011 | Bates |
| 8,041,614 | B2 | 10/2011 | Bhogal |
| 8,046,700 | B2 | 10/2011 | Bates |
| 8,051,462 | B2 | 11/2011 | Hamilton, II |
| 8,055,656 | B2 | 11/2011 | Cradick |
| 8,056,121 | B2 | 11/2011 | Hamilton, II |
| 8,057,307 | B2 | 11/2011 | Berstis |
| 8,062,130 | B2 | 11/2011 | Smith |
| 8,063,905 | B2 | 11/2011 | Brown |
| 8,070,601 | B2 | 12/2011 | Acharya |
| 8,082,245 | B2 | 12/2011 | Bates |
| 8,085,267 | B2 | 12/2011 | Brown |
| 8,089,481 | B2 | 1/2012 | Shearer |
| 8,092,288 | B2 | 1/2012 | Theis |
| 8,095,881 | B2 | 1/2012 | Reisinger |
| 8,099,338 | B2 | 1/2012 | Betzler |
| 8,099,668 | B2 | 1/2012 | Garbow |
| 8,102,334 | B2 | 1/2012 | Brown |
| 8,103,640 | B2 | 1/2012 | Lo |
| 8,103,959 | B2 | 1/2012 | Cannon |
| 8,105,165 | B2 | 1/2012 | Karstens |
| 8,108,774 | B2 | 1/2012 | Finn |
| 8,113,959 | B2 | 2/2012 | De Judicibus |
| 8,117,551 | B2 | 2/2012 | Cheng |
| 8,125,485 | B2 | 2/2012 | Brown |
| 8,127,235 | B2 | 2/2012 | Haggar |
| 8,127,236 | B2 | 2/2012 | Hamilton, II |
| 8,128,487 | B2 | 3/2012 | Hamilton, II |
| 8,131,740 | B2 | 3/2012 | Cradick |
| 8,132,235 | B2 | 3/2012 | Bussani |
| 8,134,560 | B2 | 3/2012 | Bates |
| 8,139,060 | B2 | 3/2012 | Brown |
| 8,139,780 | B2 | 3/2012 | Shearer |
| 8,140,340 | B2 | 3/2012 | Bhogal |
| 8,140,620 | B2 | 3/2012 | Creamer |
| 8,140,978 | B2 | 3/2012 | Betzler |
| 8,140,982 | B2 | 3/2012 | Hamilton, II |
| 8,145,676 | B2 | 3/2012 | Bhogal |

(56) References Cited

U.S. PATENT DOCUMENTS

| | | |
|---|---|---|
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2001/0011238 A1 | 8/2001 | Eberhard |
| 2002/0078203 A1 | 6/2002 | Greschler |
| 2002/0128975 A1 | 9/2002 | Klemba |
| 2002/0157089 A1 | 10/2002 | Patel |
| 2002/0174422 A1 | 11/2002 | Kelley |
| 2003/0216958 A1 | 11/2003 | Register |
| 2004/0015961 A1 | 1/2004 | Chefalas |
| 2004/0107368 A1 | 6/2004 | Colvin |
| 2004/0117628 A1 | 6/2004 | Colvin |
| 2004/0117631 A1 | 6/2004 | Colvin |
| 2004/0117644 A1 | 6/2004 | Colvin |
| 2004/0117663 A1 | 6/2004 | Colvin |
| 2004/0117664 A1 | 6/2004 | Colvin |
| 2004/0225894 A1 | 11/2004 | Colvin |
| 2005/0059483 A1* | 3/2005 | Borge ............ A63F 13/02 463/29 |
| 2009/0113448 A1 | 4/2009 | Smith |
| 2013/0283397 A1* | 10/2013 | Griffin ............ H04W 4/001 726/28 |
| 2014/0121008 A1* | 5/2014 | Canessa ......... A63F 13/02 463/29 |
| 2014/0344725 A1 | 11/2014 | Bates |
| 2015/0026296 A1* | 1/2015 | Halpern .......... H04L 67/06 709/217 |
| 2016/0191671 A1 | 6/2016 | Dawson |
| 2016/0192108 A1* | 6/2016 | Chaudhary ...... H04W 4/003 455/411 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 0565314 A2 | 10/1993 |
| EP | 0570123 A1 | 11/1993 |
| EP | 668583 | 8/1995 |
| EP | 0841615 A2 | 5/1998 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 565314 | 11/1944 |
| GB | 570123 | 6/1945 |
| GB | 2339938 | 10/2002 |
| GB | 2352154 | 7/2003 |
| JP | 04100148 | 4/1992 |
| JP | 08190529 | 7/1996 |
| JP | 09069044 | 3/1997 |
| JP | 10040098 | 2/1998 |
| JP | 10143357 | 5/1998 |
| JP | 10283270 | 10/1998 |
| JP | 11024918 | 1/1999 |
| JP | 11110209 | 4/1999 |
| JP | 11238038 | 8/1999 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |

(56) References Cited

FOREIGN PATENT DOCUMENTS

| | | |
|---|---|---|
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Lawton, George. Intellectual-Property Protectioon Opens Path for E-commerce. "Computer" IEEE Computer Societyu, vol. 33, No. 2 (Feb. 2000) 14-17 & 21.

T. Bartoletti, L.A. Dobbs, M. Kelley, "Secure Software Distribution System", Feb. 1997.

Kibbey, M.H.; "MARCON II: Information Control on a Microcomputer"; Library Hi Tech, vol. 4, No. 2; pp. 11-21; Summer 1986.

Chime: A Metadata-based Distributed Software Development Environment, Stephan A. Dossick et al, CUCS Technical Report #CUCS-006-99, Oct. 1999, 12 pages.

* cited by examiner

SYSTEM AND METHOD OF USING PHYSICAL OBJECTS TO CONTROL SOFTWARE ACCESS

FIELD OF THE INVENTION

The invention relates generally to a system and method of using physical objects to control software access, and more particularly to a system and method of providing physical toys that enable users to download, unlock, or otherwise access all (or a portion of) a software application.

BACKGROUND OF THE INVENTION

Research indicates that toy purchases for children are typically met with less resistance from parents than are purchases (or free downloads) of mobile software applications (or mobile "apps"). Indeed, there are a number of considerations that often give parents pause when it comes to allowing their children to download mobile games or other apps. For example, parents are often concerned with things such as the age appropriateness of an app's content, the collection and sharing of personal data (e.g., name, birthdate, location, etc.) about their children, and the risk of cyberbullying or exposure to inappropriate language or conduct (e.g., for those apps that have a social networking component). Many parents also worry about the potential for children to incur substantial charges, whether knowingly or not, through repeated in-app purchases. Further, some parents may be unwilling to initiate accounts with application marketplaces (e.g., the App Store, Google Play, Amazon Marketplace, the Windows Store, Steam, etc.), many of which require users to link a credit card to the account.

Unlike concerns associated with app downloads, parents often have a greater level of comfort when it comes to the purchase of a physical toy (e.g., whether on-line or at a brick-and mortar retailer) since they are able to, among other things, examine a tangible product, read directions, identify recommended age levels, etc. in order to arrive at a level of comfort with the purchase.

Unfortunately, children miss out on benefits that some mobile apps can provide when parents restrict their use. For example, many mobile games and other apps developed for children can be fun and relaxing, and can help children develop important skills such as, for example, time management, multi-tasking, etc., in addition to basic computing skills Many children's mobile apps are additionally intended to be used with parents, thereby allowing parents and their kids to spend quality time together.

These and other drawbacks exist.

SUMMARY OF THE INVENTION

The invention addressing these and other drawbacks relates generally to a system and method of using physical objects to control software access, and more particularly to a system and method of providing physical toys that enable users to download, unlock, or otherwise access all (or a portion of) a software application.

One aspect of the invention relates to a computer-implemented method of providing access to an executable software application stored on a host computer system, the method being implemented in the host computer system having one or more physical processors programmed with computer program instructions that, when executed by the one or more physical processors, cause the host computer system to perform the method, the method comprising: receiving, at the host computer system, from a computing device, a unique identifier read from a physical object; authenticating, by the host computer system, the unique identifier; authorizing, by the host computer system, a download of the executable software application to the computing device responsive to authentication of the unique identifier; transmitting, by the host computer system, the executable software application to the computing device; and restricting, by the host computer system, further downloads of the executable software application for the unique identifier.

One aspect of the invention relates to a system for providing access to an executable software application stored on a host computer system, the system comprising: a physical object, the physical object comprising a unique identifier; and a host computer system, the host computer system having one or more physical processors programmed with computer program instructions that, when executed by the one or more physical processors, cause the host computer system to: receive, from a computing device, the unique identifier read from the physical object; authenticate the unique identifier; authorize a download of the executable software application to the computing device responsive to authentication of the unique identifier; transmit the executable software application to the computing device; and restrict further downloads of the executable software application for the unique identifier.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
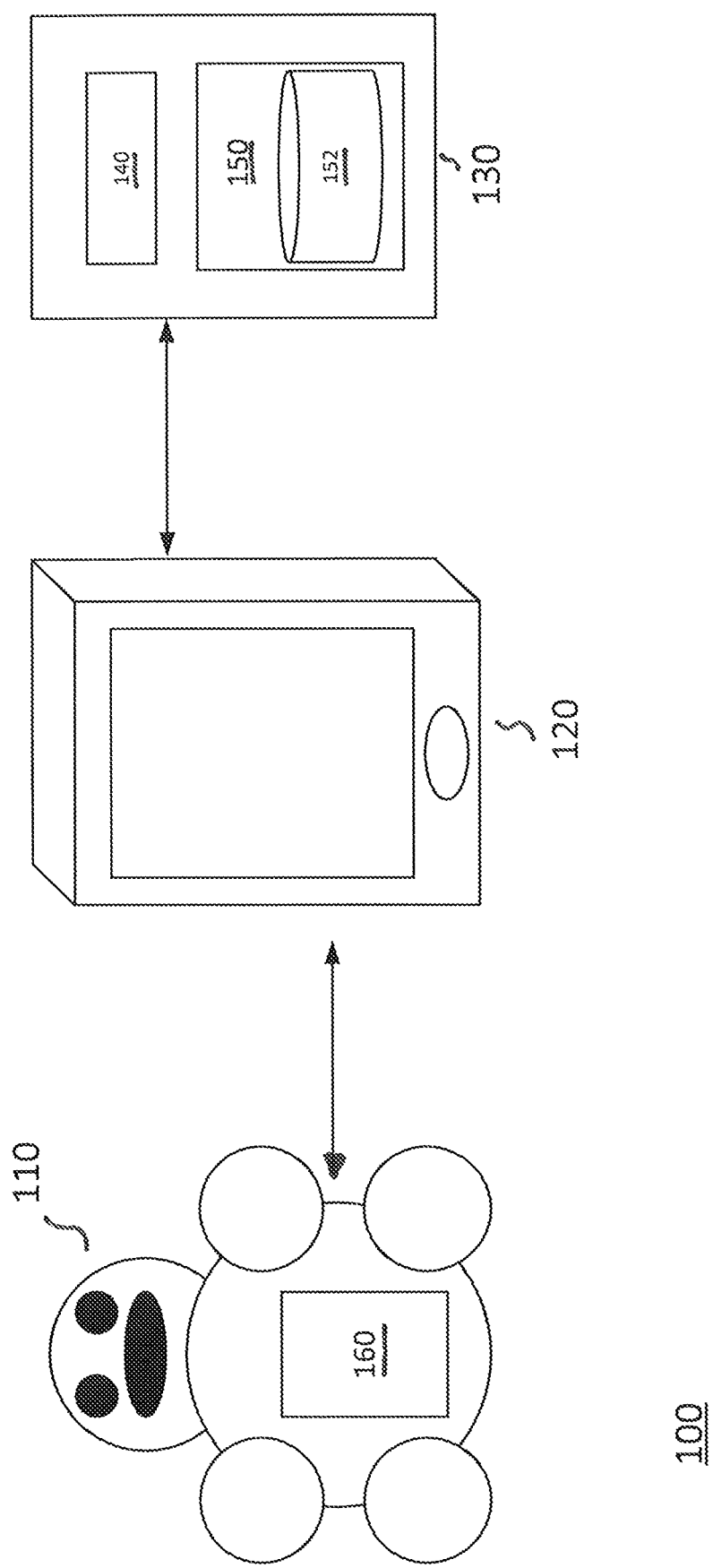
FIG. 1 illustrates an exemplary system for using a physical object to control access to software, according to an implementation of the invention.

The invention relates generally to a system and method of using physical objects to control software access, and more particularly to a system and method of providing physical toys that enable users to download, unlock, or otherwise access all (or a portion of) a software application.

As used herein, a "toy" may comprise any type of object for children to play with, including, but not limited to, teddy bears, action figures, robots, dolls, figurines, cars, trains, building blocks, balls, trading cards, etc. The toys may be designed for use by children of various recommended age levels.

The invention enables an owner of a toy (e.g., a purchaser or a recipient) to download, unlock, or otherwise access all (or a portion) of a software application (e.g., a mobile application). In some implementations, a stand-alone, executable application may be downloaded, unlocked, or otherwise accessed using a toy, as described in greater detail herein. In other implementations, updates, add-ons, or other components of a previously-acquired or installed software application may be downloaded, unlocked, or otherwise accessed using the toy. Accordingly, any of the implementations described herein may be equally applicable to stand-alone, executable software applications, as well as updates, add-ons, or other components of previously-acquired or installed software applications.

In some implementations, the software may have a direct relationship with the toy, and may include content related to the toy. As a non-limiting example, the software may include a game, video, story and/or other application associated with the toy, and may include, in some instances, a virtual (or digital) depiction of the toy. In other implementations, the software may have an indirect relationship with the toy.

In one implementation, a toy may include a key for accessing software, such as a mobile device app or content for a mobile device. For example, a toy may include a unique printed identifier ("ID") in the form of a barcode, QR code, watermark, or alphanumeric passcode, or other form of unique ID. In some implementations, the toy may include a unique electronic ID readable via wireless technologies such as, for instance, Bluetooth, Near Field Communication (NFC) and/or Radio Frequency Identification (RFID). A toy owner may use a mobile device, such as a smart phone or tablet, to read or otherwise detect the unique printed or electronic ID. The toy owner may then be granted download access to a corresponding mobile device app.

In another implementation, a toy may include the software itself. For example, a toy may include a digital storage device such as a solid state memory device (or other storage device) that stores an app or other software. The toy may be configured to communicate with a mobile device via a wired (e.g., USB) and/or wireless connection (e.g., Bluetooth, NFC, RFID, etc.). The mobile device may download the app or other software from the toy. After download, the mobile device may communicate with a server to authenticate the software and/or may authenticate the software via further communication with the toy.

For ease of explanation, the invention will be described herein with reference to a toy and a corresponding (or associated) mobile application. It should be appreciated, however, that any of the implementations described herein may be equally applicable to any type of physical object and corresponding software application, for users of any age, and for any intended purpose (whether for entertainment, business, educational, or other purposes). As one non-limiting example, a sports fan may purchase a replica football helmet (or other object) corresponding to their favorite football team that enables them to download, unlock, or otherwise access all (or a portion of) a software application that includes content directed to the team. Countless other examples exist.

FIG. 1 illustrates a system 100 for controlling software access with a physical object. In one implementation, system 100 may include a toy 110, a computing device 120, a server (or host computer system) 130 and/or other components.

Toy 110 may, as noted above, comprise any type of object for children to play with. In one implementation, toy 110 may include a unique identifier 160. Unique identifier 160 may comprise a series of numbers and/or characters that serve to uniquely identify toy 110. Unique identifier 160 may be represented visually as a visual identifier, and may be printed directly on the toy, may be printed on a label adhered to the toy, may be included separately from the toy in packaging of the toy, may be etched or incised into the toy, and/or may be associated with the toy in any other appropriate manner.

A unique visual identifier may include a QR code, a bar code, a watermark, a series of numbers and/or characters, or any other visual means of presenting unique identifier 160. Identifier 160 may also comprise an electronic identifier including, but not limited to, an RFID chip, a smart chip, and/or any other type of identifying means via which the identifier 160 may be read through electronic means.

Unique identifier 160 may include any type of identifier or code that may differ from other unique identifiers 160 associated with other, similar, toys. Unique identifier 160 may include hierarchical information identifying the class of toy with which it is associated (e.g., action figure or train), the member within the identified class (e.g., a specific action figure), a numbered one of the members of that class, and/or other information. For example, identifier 160 may identify a toy as being a particular numbered toy in a series of similarly-manufactured action figures. Thus, unique identifier 160 may serve to uniquely identify toy 110 from all other toys 110. Unique identifier 160 may additionally or alternatively include information about software to be downloaded, for example, the name of the software, an identification number, a version number, and a download location, among other information.

In some implementations, toy 110 may be packaged to prevent access to unique identifier 160 to someone that has not purchased toy 110. For example, a visual identifier may be hidden by toy packaging or by an adhesive label covering the identifier. An electronic identifier may be electromagnetically shielded by packaging components to prevent a non-purchaser from reading the identifier 160 through the packaging without making a purchase. In some implementations, toy 110 may include an identifier 160 that includes both an electronic portion readable by electronic means and a visual portion, for example, a number sequence for authenticating the electronic portion.

Computing device 120 may be any computing device configurable to run software applications. For example, computing device 120 may comprise, without limitation, a gaming console, a handheld gaming device, a personal computer (e.g., a desktop computer, a laptop computer, etc.), a smartphone, a tablet computing device, and/or other device that can be programmed to run software applications. In some implementations, computing device 120 may comprise a handheld mobile device configured to play games. Computing device 120 may be configured to run operating systems such as, for example, Apple iOS, Android, Windows Mobile, or other operating systems. Computing device 120 may additionally be configured to run an operating system specific to toys 110 including unique identifiers 160.

Figure 2:
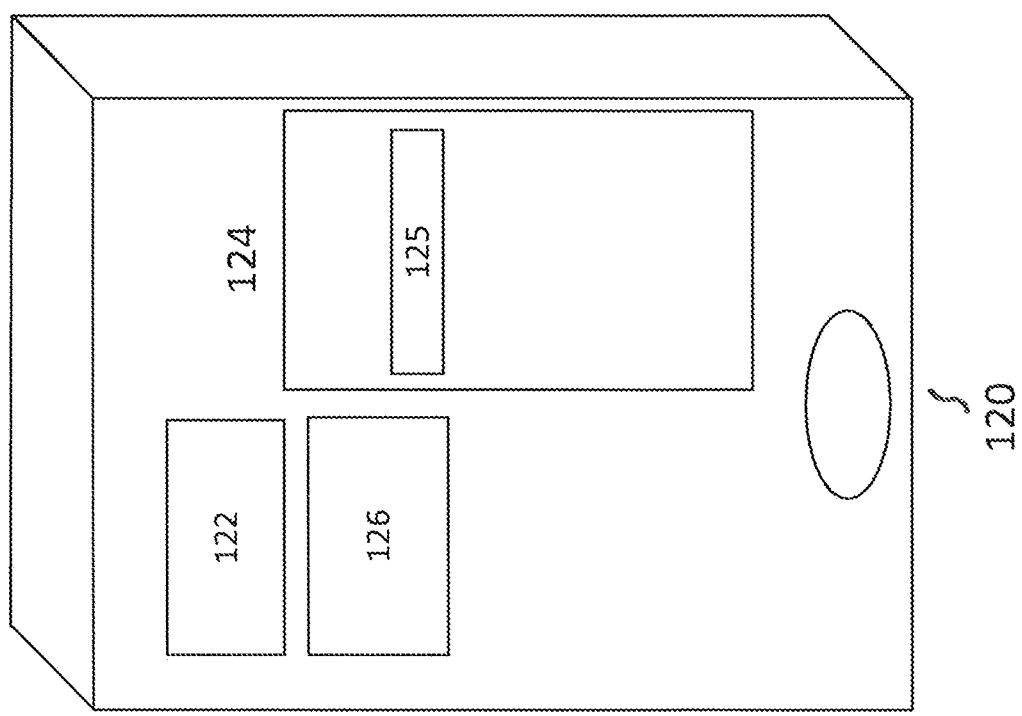
FIG. 2 illustrates an exemplary computing device, according to an implementation of the invention.

As shown in FIG. 2, computing device 120 may include one or more processors 122 (also interchangeably referred to herein as processors 122, processor(s) 122, or processor 122 for convenience), one or more storage devices 124 (which may store at least a communications module 125), and/or other components. Processors 122 may be programmed by one or more computer program instructions. For example, processors 122 may be programmed by communications module 125 and/or other instructions. Computing device 120 may further include one or more input devices 126. Input device 126 may include, for example, a camera, a data port (e.g., USB port, lightning cable port), and/or an antenna designed for Bluetooth, RFID and/or NFC communications. The computer program instructions described herein may be stored in one or more storage devices 124, which may comprise random access memory (RAM), read only memory (ROM), and/or other memory. The one or more storage devices 124 may store the computer program instructions (e.g., the aforementioned instructions) to be executed by processor 122 as well as data that may be manipulated by processor 122. The one or more storage devices 124 may comprise floppy disks, hard disks, optical disks, tapes, or other storage media for storing computer-executable instructions and/or data.

Referring back to FIG. 1, server 130 may include may include one or more processors 140 (also interchangeably referred to herein as processors 140, processor(s) 140, or processor 140 for convenience), one or more storage devices 150, and/or other components. Processors 140 may be programmed by one or more computer program instructions, which may be stored on storage devices 150 and/or elsewhere.

Although illustrated in FIG. 1 as comprising individual components, computing device 120 and server 130 may each include a plurality of components (e.g., computer devices) each programmed with at least some of the functions described herein. In this manner, some components of computer device 120 and/or server 130 may perform some functions while other components may perform other functions, as would be appreciated. The one or more processors 122 and 140 may each include one or more physical processors that are programmed by computer program instructions. The various instructions described herein are exemplary only. Other configurations and numbers of instructions may be used, so long as the processor(s) 122 and 140 are programmed to perform the functions described herein.

Furthermore, the description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 122 and 140 may be programmed by one or more additional instructions that may perform some or all of the functionality attributed herein to one of the instructions.

Figure 3:
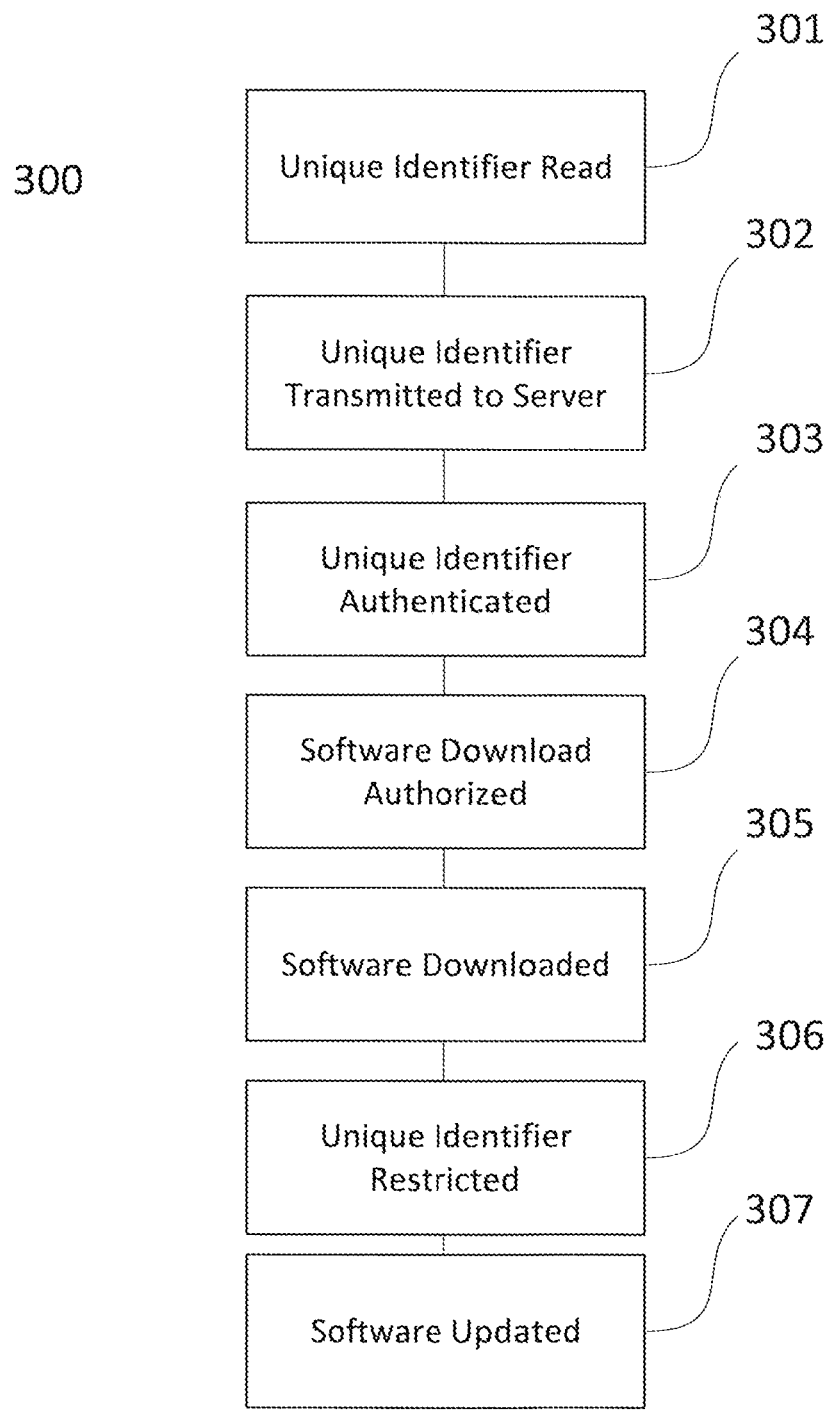
FIG. 3 illustrates an exemplary process of controlling software access via a physical object, according to an implementation of the invention.

FIG. 3 illustrates an exemplary process 300 of controlling access to software with a physical object, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Operation 301 of process 300 may comprise the reading of unique identifier 160 associated with toy 110 by computing device 120. Computing device 120 may perform an identifier reading operation 301 with input device 126. For example, a camera of computing device 120 may be used to capture an image of a visual identifier such as a QR code, a bar code, a watermark, a series of numbers and/or characters, or other visual identifier. Alternatively, a data port of computing device 120 may be used to connect directly to a corresponding data port of toy 110 to electronically read identifier 160. In some implementations, computing device 120 may read identifier 160 via Bluetooth, RFID, NFC, or other techniques. In some implementations, a unique identifier may be manually input by a user.

Operation 302 of process 300 may comprise the transmission of unique identifier 160 to server 130. For example, computing device 120 may transmit identifier 160 to server 130 for verification. Computing device 120 may transmit identifier 160 via any communication means available. In computing devices that include cellular antennas, identifier 160 may be transmitted via a cellular network. In some implementations, computing device 120 may transmit identifier 160 over a network (e.g., the Internet) via a network connection. Computing device 120 may further transmit information that uniquely identifies computing device 120. In some implementations, computing device 120 may connect to another device, e.g. a laptop, to establish a connection with server 130 and transmit identifier 160.

Operation 303 of process 300 may comprise authentication of identifier 160. Server 130 may, for example, compare a received identifier 160 with an identifier database 152 of permissible identifiers stored on memory device 150. As discussed above, identifier 160 may include information about the toy 110 with which it is associated. Server 130 may confirm that the identifier 160 is a valid identifier (e.g., that the identifier exists within identifier database 152 of valid identifiers). Server 130 may further identify the app or other software associated with the identifier 160. Server 130 may also confirm that identifier 160 is valid for use on the device 120 that transmitted it. That is, server 130 may determine whether or not identifier 160 is restricted (as discussed in further detail below). Upon determination that identifier 160 is a valid identifier and is valid for use on the computing device from which it was sent, server 130 may then authorize a software download in an operation 304.

Thus, server 130 may receive unique identifier 160 and associate it with a specific software application for download. For example, an identifier 160 associated with a toy 110, where the toy is an action figure, may identify a software application for download associated with the action figure. In another example, an identifier 160 associated with a toy 110, where the toy is a teddy bear, may identify a software application for download associated with teddy bears. In some implementations, an identified software application may have a specific relationship with toy 110 (e.g., the software application may feature a digital or virtual version of the toy itself). In some implementations, the digital version of the toy may be controllable or useable by a user of the software application. In some implementations, an identified software application may have a generic relationship with toy 110, e.g., the software application may feature characters similar to or related to toy 110. In some implementations, an identified software application may have a plurality of versions, one or more of which is associated with a toy 110. In some implementations, an identified software application may be associated with toys sharing a same class or type with a toy 110. Non-limiting examples of toy classes or types include whether the toy is from a particular series, franchise, or storyline, whether the toy is a vehicle, action figure, etc., whether the toy is a wizard, warrior, thief, etc., whether the toy has certain powers, etc. Any other characteristics may be used to define toy classes or types. In some implementations, identified software may include add-ons, boosters, or other additional content for previously acquired application. For example, software identified by a race car may permit a user to use a digital version of the race car inside of a previously purchased racing game. In some implementations, unique identifier 160 may be associated with multiple applications or software and a user may select one or more that they wish to download.

Operation 304 of process 300 may comprise authorization of a software download. Software download authorization permits a user of computing device 120 to download the software application identified or selected during authentication operation 303.

Operation 305 of process 300 may comprise download of the identified software application to computing device 120. The identified application may be downloaded to computing device 120 via any available method, including, but not limited to, cellular connections, Wi-Fi connections, LAN connections, and others. After downloading, computing device 120 may launch or run the identified application and confirm to server 130 that the downloaded software has been downloaded and installed properly. After software download, usage of the software may not require toy 110. That is, toy 110 may be necessary to authorize the software download, but may not be necessary for software use.

Operation 306 of process 300 may comprise the restriction of unique identifier 160. For example, server 130 may update identifier database 152 with information that indicates that unique identifier 160 has been used. For example, server 130 may update identifier database 152 with information about the computing device 120 that downloaded software associated with identifier 160. Thus, server 130 may prevent any device other than computing device 120 from downloading the software. In some implementations, server 130 may update identifier database 152 with information about the user or user account that downloaded software associated with identifier 160 and prevent any other users or user accounts from downloading the software. In some implementations, server 130 may be further configured to deauthorize the software downloaded to computing device 120 to permit download to a second, different device. In some implementations, server 130 may permit multiple downloads of software associated with identifier 160, and may update the database after each download. In some implementations, server 130 may authorize two or more computing devices 120 for software download. In some implementations, the number of computing devices 120 authorized for software download may be limited in number. In some implementations, server 130 may permit computing device 120 to download the software multiple times, for example, if the downloaded software becomes corrupted or is deleted, or if a new version or update is available.

Operation 307 of process 300 may comprise updating the identified software. In some implementations, computing device 120 may regularly communicate with server 130, either by transmitting a query or receiving a notification, or both, to ascertain the status of downloaded software on computing device 120. If a version of the software stored on server 130 is an updated version, server 130 may authorize downloads of software updates to computing device 120, which may be associated with the identified software in identifier database 152.

Thus, according to the above system and processing operations, a customer may purchase toy 110. The customer may then unpackage toy 110 to access the unique identifier 160. As discussed above, toy 110 may be packaged so as to prevent a non-purchaser from reading unique identifier 160. The customer may read the identifier 160 with their computing device 120 and download the associated software from server 130. Toy 110 may therefore authorize or control access to software.

Figure 4:
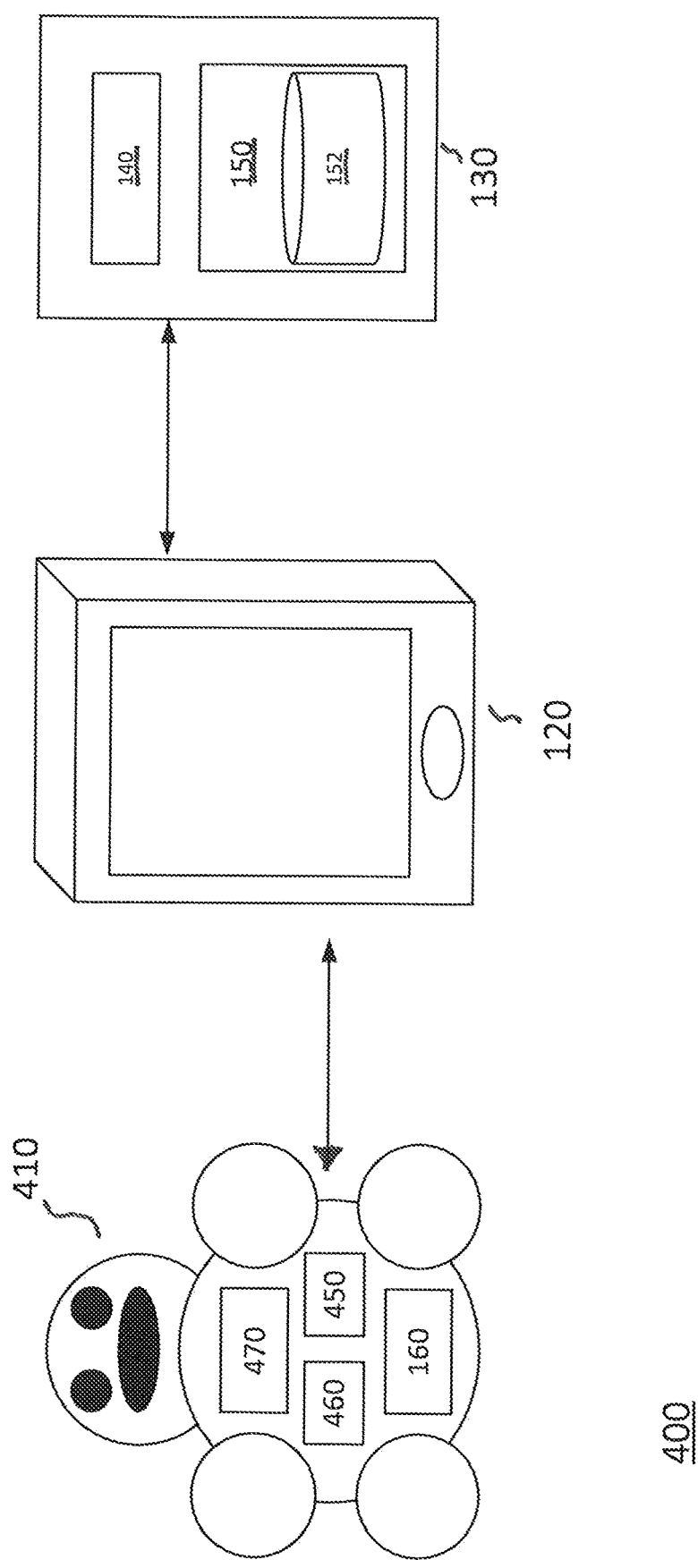
FIG. 4 illustrates an exemplary system for using a physical object to control access to software, according to an implementation of the invention.

FIG. 4 is an exemplary depiction of a system 400 for using a physical object to control access to software, according to an implementation of the invention. In some implementations, system 400 may include a toy 410, a computing device 120, a server 130 and/or other components.

According to an aspect of the invention, toy 410 may comprise at least one processor 450, a memory device 460, a communications interface 470, and/or other components (e.g., an internal power source). Memory device 460 may comprise a non-volatile memory device, such as an SD card, for example. Communications interface 470 may comprise any device to facilitate data transfer with a computing device. For example, communications interface 470 may include a data port or an antenna configured for communication with a computing device, such as via RFID, Bluetooth, and/or NFC technologies. Processor 450 may be programmed with software instructions to access memory device 460 and communications interface 470.

Memory device 460 may be connected to communications interface 470, such that processor 450 may facilitate transfer of data from memory device 460 to computing device 120. Such data transfer may occur through wired transfer, e.g. via a USB port, and/or via wireless transfer, e.g. via a Bluetooth, RFID, Wi-Fi, or NFC connection. In some implementations, toy 410 may exclude processor 450 and may permit access to data stored on memory device 460 without the intervention of such processor. In some implementations, toy 410 may be configured to permit data transfer to mobile device 120 without the need for an internal source of power.

Memory device 460 may be configured to store a software application. Thus, computing device 120 may establish a data transfer connection with memory device 460 of toy 410 to transfer a software application from memory device 460 of toy 410 to computing device 120.

Toy 410 may include unique identifier 160. As discussed above, identifier 160 may be a visual identifier and/or an electronic identifier. In implementations including an electronic identifier, identifier 160 may be stored on memory device 460. In some implementations, identifier 160 may be included within software stored on memory device 460. Unique identifier 160 may uniquely identify toy 410 and/or the software applications stored on toy 410.

In some implementations, toy 410 may be packaged to prevent access to unique identifier 160 and memory device 460 to someone that has not purchased toy 110. For example, a visual identifier may be hidden by toy packaging or by an adhesive label covering the identifier. Communications interface 470 may be covered by packaging and/or may be electromagnetically shielded by packaging components to prevent a non-purchaser from reading the identifier 160 through the packaging without making a purchase. In some implementations, toy 410 may include an identifier 160 that includes both an electronic portion readable by electronic means and a visual portion, for example, a number sequence for authenticating the electronic portion.

As illustrated in FIG. 4, computing device 120 and server 130 may each be substantially similar to that described with respect to FIG. 1.

Figure 5:
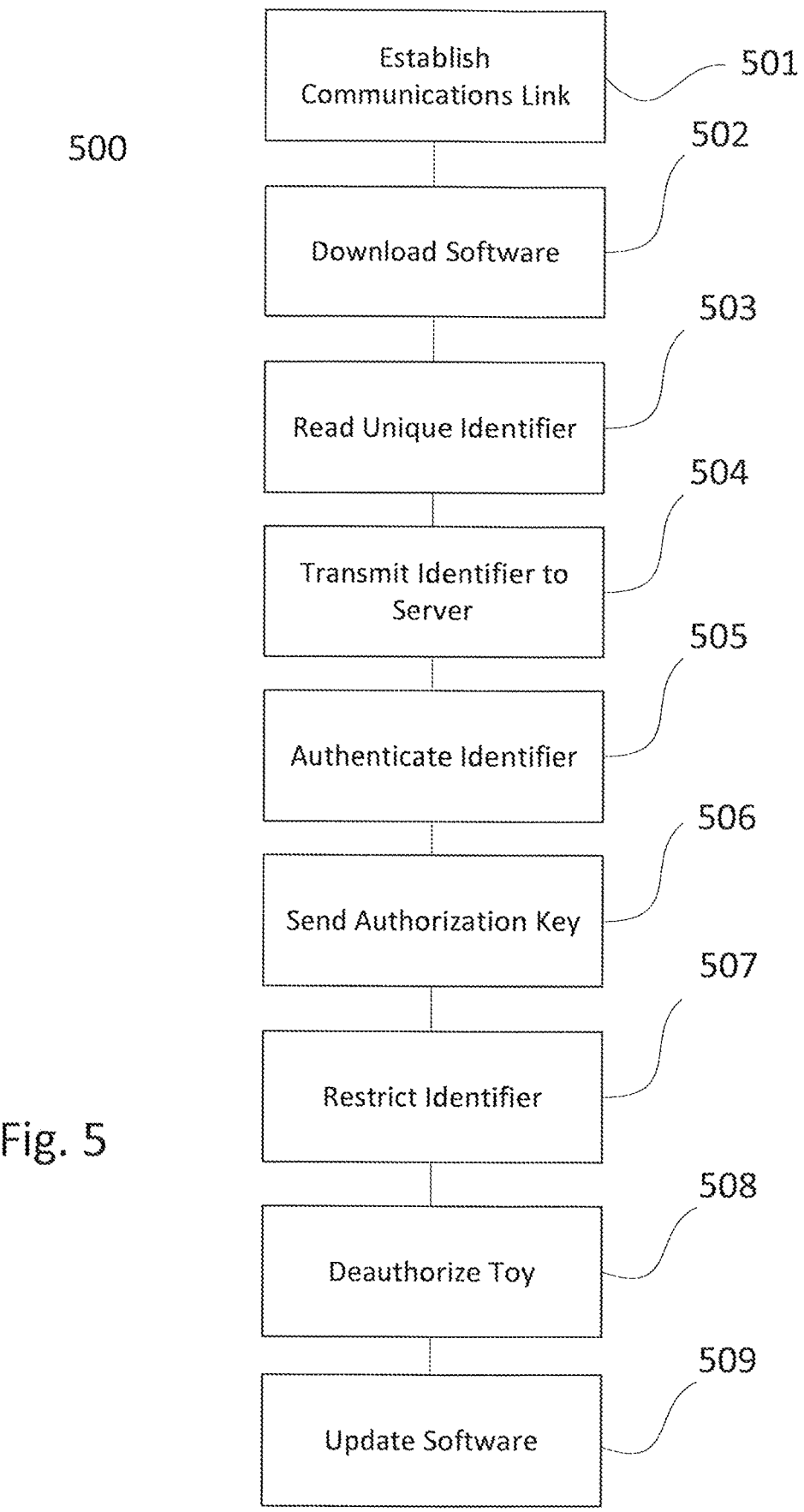
FIG. 5 illustrates an exemplary process of controlling software access via a physical object, according to an implementation of the invention.

FIG. 5 illustrates an exemplary process 500 of controlling access to software with a physical object, according to an implementation of the invention. The various processing operations and/or data flows depicted in FIG. 5 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

An operation 501 of process 300 may comprise establishing a communications link between computing device 120 and communications interface 470 of toy 410. The communications link may be facilitated by processor 122 of computing device 120 and/or processor 450 of toy 410. The communications link may be established to permit the transfer of data from memory device 460 of toy 410 to a storage device 124 of computing device 120.

An operation 502 of process 500 may comprise downloading a software application from memory device 460 of toy 410 to storage device 124 of computing device 120. Software may include applications for running on computing device 120, for example, a game, video, story and/or other application associated with toy 410. Downloaded software may have a direct or indirect relationship with toy 410.

An operation 503 of process 500 may comprise reading unique identifier 160 by computing device 120. The reading of unique identifier 160 may be performed by transferring unique identifier 160 from memory 460 of toy 410 to storage device 124 of computing device 120. In implementations wherein identifier 160 is a visual identifier, computing device 120 may receive the identifier 160 via input device 126. In some implementations, a user of computing device 120 may enter the characters of an identifier 160 into computing device 120 via a user interface. In some implementations, downloaded software application may include unique identifier 160, in which case unique identifier 160 may be read from the downloaded software.

Operation 504 of process 500 may comprise transmitting unique identifier 160 to server 130. Computing device 120 may be used to transmit identifier 160 to server 130 for verification. Computing device 120 may transmit the identifier via any communication means available. In computing devices that include cellular antennas, identifier 160 may be transmitted via a cellular network. In some implementations, computing device 120 may transmit identifier 160 over the internet, for example via a Wi-Fi or LAN connection. Computing device 120 may further transmit information that uniquely identifies the computing device 120. In some implementations, computing device 120 may require connection to another device, e.g. a laptop, to establish a connection with server 130 and transmit identifier 160.

Operation 505 of process 500 may comprise authentication of identifier 160. Server 130 may compare a received identifier 160 with an identifier database 152 of permissible identifiers stored on memory device 150. Identifier 160 may include information about toy 410 and/or the software application with which it is associated. Server 130 may confirm that the identifier 160 is a valid identifier, e.g., that the identifier code exists within identifier database 152 of valid identifiers. Server 130 may further identify the app or other software associated with the identifier 160. Server 130 may also confirm that identifier 160 is valid for use on the computing device 120 that transmitted it. That is, server 130 may determine whether or not identifier 160 is restricted (as discussed in further detail below.) Upon determination that identifier 160 is a valid identifier and is valid for use on the computing device from which it was sent, server 130 may then authorize a software key download at operation 506. The software key may be necessary to activate the application downloaded from toy 410 to computing device 120.

Operation 505 of process 500 may comprise downloading the authorized software key to computing device 120. The authorized software key may be downloaded to computing device 120 via any available method, including, but not limited to, cellular connections, Wi-Fi connections, LAN connections, and others. After downloading, computing device 120 may launch or run the identified software or application and confirm to server 130 that the downloaded software has been properly authorized. After software key download, usage of the software application on computing device 420 may no longer require toy 410.

Operation 507 of process 500 may comprise the restriction of unique identifier 160. Server 130 may update identifier database 152 with information that unique identifier 160 has been used, and that further downloads should be restricted. For example, server 130 may update identifier database 152 with information about computing device 120, which downloaded software associated with identifier 160. Thus, server 130 may prevent any device other than computing device 120 from downloading the software key. In some implementations, server 130 may update identifier database 152 with information about the user or user account that downloaded software associated with identifier 160 and prevent any other users or user accounts from downloading the software. In some implementations, server 130 may be further configured to deauthorize the software key downloaded to computing device 120 to permit download to a second, different device. In some implementations, server 130 may permit multiple downloads of a software key associated with identifier 160, and may update the database after each download. In some implementations, server 130 may authorize two or more computing devices 120 for software key download. In some implementations, the number of computing devices 120 authorized for software key download may be limited in number. In some implementations, server 130 may permit computing device 120 to download the software key multiple times, for example, if the downloaded software key becomes corrupted or is deleted.

In some implementations, operation 508 of process 500 may comprise de-authorizing toy 410 from permitting further downloads of the software. Software download and authorization may occur simultaneously on computing device 120. In some implementations, an additional step may cause computing device 120 to notify processor 450 of toy 410 to update memory device 460 so as to prevent further attempts to download the associated software. In some implementations, the software may be deleted from toy 410. In some implementations, server 130 may be further configured to cause computing device 120 to reauthorize toy 410 for future downloads. Such reauthorization may occur, for example, if a user has lost or deleted the software from computing device 120.

Operation 509 of process 500 may comprise updating the identified software. In some implementations, computing device 120 may regularly communicate with server 130, either by transmitting a query or receiving a notification, or both, to ascertain the status of downloaded software on computing device 120. For example, a provider of toy 410 and/or an administrator associated with the software application stored on toy 410 (when toy 410 is manufactured) may make software application updates available via server 130. In other words, a user may download the software application from toy 410, and then receive subsequent software application updates from server 130.

Thus, according to the above system and processing operations, a customer may purchase toy 410. The customer may then unpackage toy 410 to access a software application stored on memory 460 of toy 410 with computing device 120. As discussed above, toy 410 may be packaged so as to prevent a non-purchaser from downloading the software. The customer may further use computing device 120 to read the identifier 160 and download the associated software key from server 130. Toy 410 may therefore authorize or control access to software.

Figure 6:
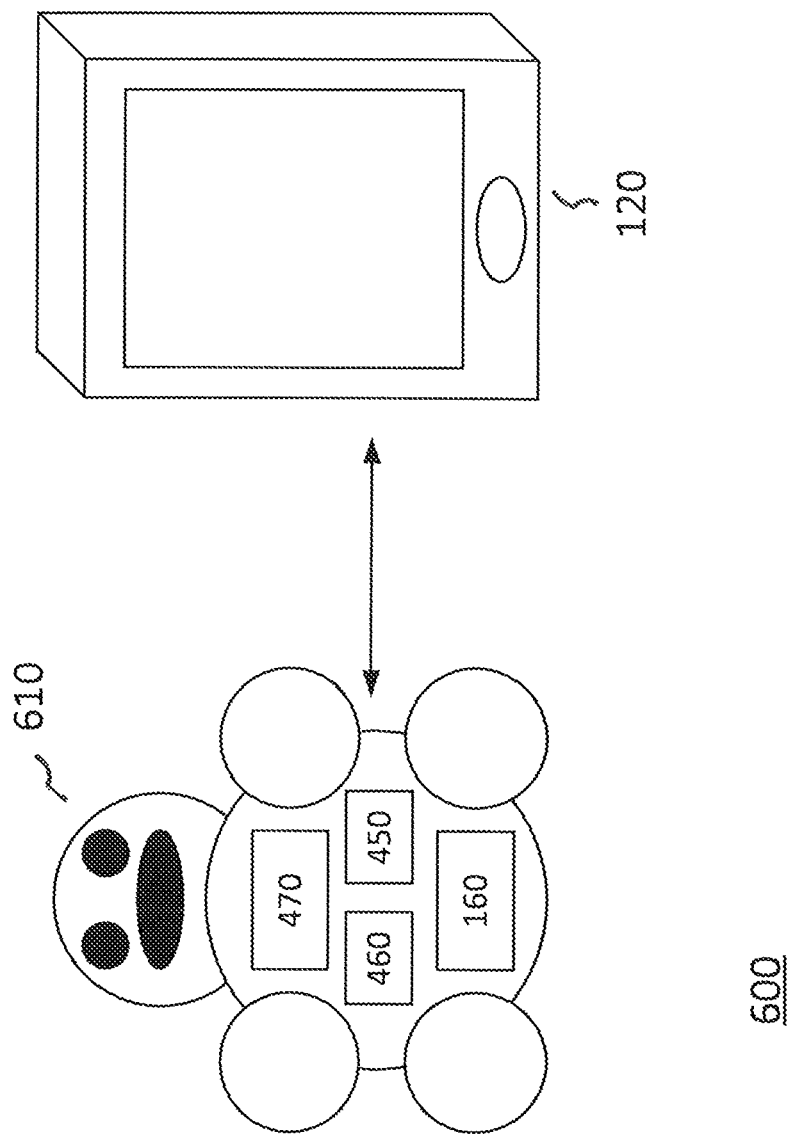
FIG. 6 illustrates an exemplary system for using a physical object to control access to software, according to an implementation of the invention.

FIG. 6 illustrates an exemplary system 600 for using a physical object to control access to software, according to an implementation of the invention. System 600 may comprise a toy 610 and a computing device 120, and/or other components. In this implementation, a software application may be downloaded from toy 610 to computing device 120 without the need for a software (activation) key from a server. As shown, toy 610 may include at least one processor 450, a memory device 460 and a communications interface 470 similar to toy 410 of FIG. 4. Computing device 120 may be substantially similar to that described with respect to FIG. 1.

Figure 7:
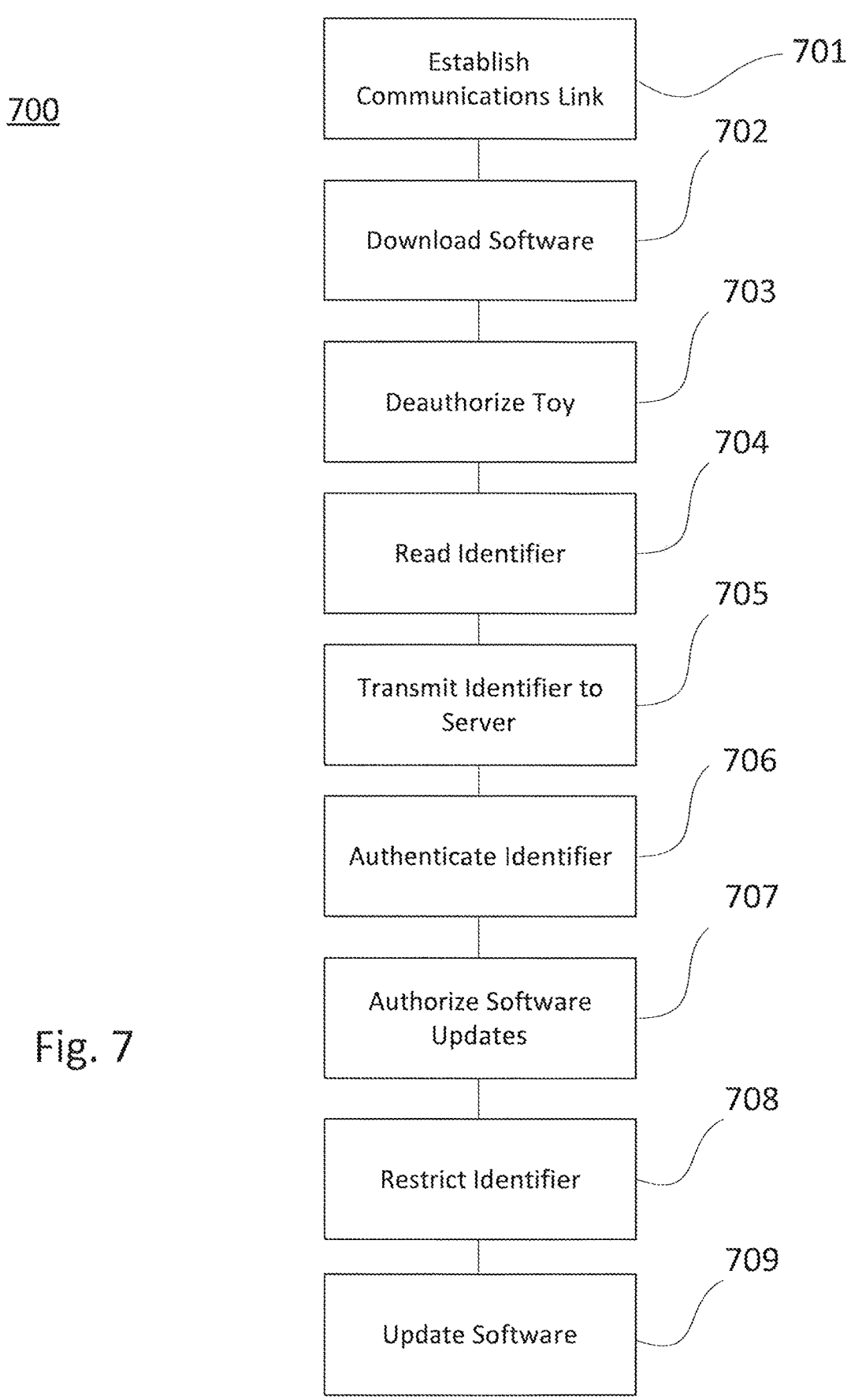
FIG. 7 illustrates an exemplary process of controlling software access via a physical object, according to an implementation of the invention.

FIG. 7 illustrates an exemplary process 700 of controlling access to software with a physical object according to an implementation of the invention. The various processing operations and/or data flows depicted in FIG. 7 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

An operation 701 of process 700 may comprise establishing a communications link between computing device 120 and communications interface 470. The communications link may be facilitated by processor 122 of computing device 120 and processor 450 of toy 410. The communications link may be established to permit the transfer of data from memory device 460 to a storage device 124 of computing device 120.

An operation 702 of process 700 may comprise downloading software from memory device 460 of toy 610 to storage device 124 of computing device 120. The software may comprise an application for running on computing device 120 such as, for example, a game, video, story and/or other application associated with toy 610. Downloaded software may have a direct or indirect relationship with toy 610. As noted above, a downloaded software application may be immediately launched upon download without requiring server authorization.

An operation 703 of process 700 may comprise restricting toy 610 from permitting further downloads to other computing devices. Once the software application has completed the download to computing device 120, toy 610 may be restricted from permitting future downloads to additional devices. In some implementations, toy 610 may prevent all future downloads. In some implementations, the software application may be deleted from toy 610. In some implementations, toy 610 may register an identity of computing device 120 and prevent future downloads to any other device. In some implementations, toy 610 may be reauthorized for future downloads through an interaction between computing device 120 and toy 610 that includes deleting the software.

In some implementations, process 700 may end after step 703. That is, the software application download from toy 610 to computing device 120 may be the final step in process 700.

In some implementations, process 700 may optionally include additional operations 704-709 associated with the use of a unique identifier to obtain software application updates from a server (such as, for example, server 130 depicted in FIGS. 1 and 4).

In an operation 704 of process 700, a unique identifier 160 may be read by computing device 120. Reading unique identifier 160 may be performed by transferring the unique identifier 160 from memory 460 of toy 610 to storage device 124 of computing device 120. In implementations wherein identifier 160 is a visual identifier, computing device 120 may receive the identifier 160 via input device 126. In some implementations, a user of computing device 120 may enter the characters of an identifier 160 into computing device 120 via a user interface. In some implementations, the downloaded software application may include unique identifier 160, and the step of reading unique identifier 160 may include extracting it from the downloaded software application.

Operation 705 of process 700 may comprise transmitting unique identifier 160 to server 130. Computing device 120 may be used to transmit identifier 160 to server 130 for verification. Computing device 120 may transmit the identifier via any communication means available. In computing devices that include cellular antennas, identifier 160 may be transmitted via a cellular network. In some implementations, computing device 120 may transmit identifier 160 over the internet, for example via a Wi-Fi or LAN connection. Computing device 120 may further transmit information that uniquely identifies the computing device 120. In some implementations, computing device 120 may require connection to another device, e.g. a laptop, to establish a connection with server 130 and transmit identifier 160.

Operation 706 of process 700 may comprise authentication of identifier 160. Server 130 may compare a received identifier 160 with an identifier database 152 of permissible identifiers stored on memory device 150. Identifier 160 may include information about toy 610 and/or software with which it is associated. Server 130 may confirm that the identifier 160 is a valid identifier, e.g., that the identifier code exists within identifier database 152 of valid identifiers. Server 130 may further identify the app or other software associated with the identifier 160. Server 130 may also confirm that identifier 160 is valid for use on the device 120 that transmitted it. That is, server 130 may determine whether or not identifier 160 is restricted (as discussed below.) Upon determination that identifier 160 is a valid identifier and is valid for use on the computing device from which it was sent, server 130 may then authorize the download of software updates to computing device 120 at step 707.

Operation 708 of process 700 may comprise the restriction of unique identifier 160. Server 130 may update identifier database 152 with information that unique identifier 160 has been used, and restrict further software updates based on that unique identifier 160. For example, server 130 may update identifier database 152 with information about computing device 120, which downloaded software associated with identifier 160. Thus, server 130 may prevent any device other than computing device 120 from downloading software updates based on unique identifier 160. In some implementations, server 130 may update identifier database 152 with information about the user or user account that downloaded software associated with identifier 160 and prevent any other users or user accounts from downloading the software. In some implementations, server 130 may be further configured to reauthorize software updates to a different computing device through a process which may include deauthorizing computing device 120 from software updates and deletion of the software from computing device 120. In some implementations, server 130 may downloads of software updates associated with identifier 160 to multiple devices, and may update the database after device is authorized. The number of multiple devices to which updates are permitted may be limited. In some implementations, once computing device 120 has been authorized for software updates, further provision of the unique identifier 160 is unnecessary. In alternative implementations, computing device 120 may be required to retrieve unique identifier 160 from toy 610 to authorize each software update.

Operation 709 of process 700 may comprise downloading software updates to computing device 120. Software updates may be downloaded to computing device 120 via any available method, including, but not limited to, cellular connections, Wi-Fi connections, LAN connections, and others. In some implementations, computing device 120 may regularly communicate with server 130, either by transmitting a query or receiving a notification, or both, to ascertain the status of downloaded software on computing device 120. If a version of the software stored on server 130 is an updated version, server 130 may authorize downloads of software updates to computing device 120, which may be associated with the identified software in identifier database 152.

Thus, according to the above system and processing operations, a customer may purchase toy 610. The customer may then unpackage toy 610 to access software stored on memory 460 with computing device 120. As discussed above, toy 610 may be packaged so as to prevent a non-purchaser from downloading the software. The customer may then operate the software on computing device 120. The customer may further use computing device 120 to read identifier 160 and download software updates from server 130. Toy 610, may therefore authorize or control access to software.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of providing access to a stand-alone executable video game application stored on a host computer system, the method being implemented in the host computer system having one or more physical processors programmed with computer program instructions that, when executed by the one or more physical processors, cause the host computer system to perform the method, the method comprising:

receiving, at the host computer system, from a computing device, a unique identifier read from a physical object;

authenticating, by the host computer system, the unique identifier, wherein said authenticating includes determining that the unique identifier is not restricted;

authorizing, by the host computer system, a download of all of the stand-alone executable video game application to the computing device responsive to authentication of the unique identifier;

transmitting, by the host computer system, the stand-alone executable software application to the computing device such that a user of the computing device has access to the stand-alone executable video game application via the computing device; and restricting, by the host computer system, further downloads of the stand-alone executable video game application for the unique identifier.

2. The method of claim 1, wherein the computing device is a mobile device.

3. The method of claim 1, wherein the physical object comprises a toy.

4. The method of claim 1, wherein the unique identifier read from the physical object comprises a printed identifier on the physical object.

5. The method of claim 4, wherein the printed identifier comprises at least one of a barcode, QR code, watermark, or alphanumeric code.

6. The method of claim 1, wherein the unique identifier read from the physical object comprises an electronic identifier.

7. The method of claim 6, wherein the electronic identifier is stored in an RFID tag of the physical object.

8. The method of claim 1, wherein the video game application includes a virtual representation of the physical object.

9. The method of claim 8, wherein the virtual representation of the physical object is controllable by a player of the video game.

10. The method of claim 1, wherein restricting, by the host computer system, further downloads of the stand-alone executable video game application for the unique identifier further comprises:

storing, by the host computer system, an association between the unique identifier and the computing device.

11. A system for providing access to stand-alone executable video game application stored on a host computer system, the system comprising:

a physical object, the physical object comprising a unique identifier; and a host computer system, the host computer system having one or more physical processors programmed with computer program instructions that, when executed by the one or more physical processors, cause the host computer system to:

receive, from a computing device, the unique identifier read from the physical object;

authenticate the unique identifier inclusive of determining that the unique identifier is not restricted;

authorize a download of all of the stand-alone executable video game application to the computing device responsive to authentication of the unique identifier;

transmit the stand-alone executable video game application to the computing device such that a user of the computing device has access to the stand-alone executable video game application via the computing device; and restrict further downloads of the stand-alone executable video game application for the unique identifier.

12. The system of claim 11, wherein the computing device is a mobile device.

13. The system of claim 11, wherein the physical object comprises a toy.

14. The system of claim 11, wherein the unique identifier comprises a printed identifier on the physical object.

15. The system of claim 14, wherein the printed identifier comprises at least one of a barcode, QR code, watermark, or alphanumeric code.

16. The system of claim 11, wherein the unique identifier comprises an electronic identifier.

17. The system of claim 16, wherein the electronic identifier is stored in an RFID tag of the physical object.

18. The system of claim 11, wherein the video game application includes a virtual representation of the physical object.

19. The system of claim 18, wherein the virtual representation of the physical object is controllable by a player of the video game.

20. The system of claim 11, wherein the host computer system is caused to restrict further downloads of the stand-alone executable video game application for the unique identifier by storing an association between the unique identifier and the computing device.

* * * * *